(12) United States Patent
Hwang et al.

(10) Patent No.: US 7,648,099 B2
(45) Date of Patent: Jan. 19, 2010

(54) HANDHELD POWER CORD ARRANGING DEVICE FOR VACUUM CLEANER

(75) Inventors: Yun-sup Hwang, Gwangju (KR); Tae-gwang Kim, Incheon (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 229 days.

(21) Appl. No.: 11/785,951

(22) Filed: Apr. 23, 2007

(65) Prior Publication Data

US 2007/0197080 A1 Aug. 23, 2007

(30) Foreign Application Priority Data

Dec. 6, 2006 (KR) .................... 10-2006-0122957

(51) Int. Cl.
*B65H 23/04* (2006.01)
(52) U.S. Cl. .............. 242/615.3; 24/132 R; 24/510
(58) Field of Classification Search ............. 242/615.2, 242/615.3, 397; 191/12.2 R, 12.4; 24/132 R, 24/499–501, 507–511
See application file for complete search history.

(56) References Cited

U.S. PATENT DOCUMENTS

| 3,609,638 | A | * | 9/1971 | Darrey | 439/369 |
| 3,780,402 | A | * | 12/1973 | Takabayashi | 24/510 |
| 3,883,929 | A | * | 5/1975 | Fortsch | 24/132 R |
| 4,175,306 | A | * | 11/1979 | Bigelow et al. | 24/507 |
| 6,491,249 | B2 | | 12/2002 | Park | |
| 2006/0231668 | A1 | * | 10/2006 | Park | 242/397 |

FOREIGN PATENT DOCUMENTS

| GB | 2425750 A | 11/2006 |
| KR | 20-0136729 | 6/1998 |
| KR | 10-0612202 | 8/2006 |
| KR | 10-2006-0107618 | 10/2006 |

* cited by examiner

*Primary Examiner*—Sang Kim
(74) *Attorney, Agent, or Firm*—Blank Rome LLP

(57) ABSTRACT

A power cord arranging device for a vacuum cleaner according to an exemplary embodiment of the present invention comprises first and second cord grips pivotably mounted and capable of being opened and closed about a hinge, and having at least two openings that receives a power cord when the cord grips are closed, and a resilient member biasing the first and second cord grips closed.

5 Claims, 6 Drawing Sheets

HANDHELD POWER CORD ARRANGING DEVICE FOR VACUUM CLEANER

CROSS-REFERENCE TO RELATED APPLICATIONS

This application claims the benefit of priority under 35 U.S.C. § 119 from Korean Patent Application No. 10-2006-0122957, filed Dec. 6, 2006, the entire contents of which are incorporated herein by reference.

This application may be related to commonly owned co-pending U.S. patent application Ser. No. 11/258,180 filed on Oct. 26, 2005, the subject matter of which is herein incorporated by reference.

FIELD OF THE INVENTION

The present invention relates to a vacuum cleaner. More particularly, the present invention relates to a power cord arranging device which enables a user to conveniently wind a power cord inside a cleaner body of an upright-type vacuum cleaner.

BACKGROUND OF THE INVENTION

Conventional canister-type vacuum cleaners comprise a cord reel assembly for winding a power cord inside the cleaner body. Conventional upright-type vacuum cleaners tend to require a relatively longer power cord, and thus use a cord holder instead of a cord reel assembly. The power cord is wound around the cord holder on the outside of the cleaner body.

In that case, a user must manually grasp and wind the power cord on the cord holder in order to hold the power cord on the cord holder on the outside of the cleaner body. During this operation, however, the power cord is often dragged on the surface being cleaned, and is thus contaminated by impurities and dust. As a result, the user's hands may also become dirty while grasping and winding the power cord. Furthermore, when the user winds the power cord hastily, frictional heat generated between the power cord and the user's hand may hurt the user.

SUMMARY OF THE INVENTION

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description.

The present invention provides a power cord arranging device for a vacuum cleaner which enables a user to safely stow a power cord on a cord holder of a cleaner body without concern about being contaminated by impurities or being hurt by frictional heat.

According to an exemplary aspect of the present invention, there is provided a power cord arranging device for a vacuum cleaner, comprising first and second cord grips which are pivotably coupled and moveable between opened and closed positions about a hinge member, and have at least two openings configured to receive a power cord when the cord grips are closed, and a resilient member biasing the first and second cord grips closed.

In an exemplary embodiment, the openings may have a cylindrical shape and may face each other, when the first and second cord grips are closed. In an exemplary embodiment, a pair of pressure levers may be mounted at a position adjacent to the hinge, and a grip handle may be mounted on the first cord grip.

In an exemplary embodiment, the hinge member may comprise a pair of shaft receptacles mounted on the first and second cord grip, and a hinge shaft mounted so as to be inserted into the shaft receptacles. In an exemplary embodiment, the resilient member may comprise a torsion spring supported by each of the pressure levers.

In an exemplary embodiment, the openings may comprise a front opening, and a rear opening having a greater diameter than the front opening. Additionally, a guide ring may be mounted on the front opening in order to prevent abrasion.

In an exemplary embodiment, the guide ring may be made of at least one of steel and brass, and may be separated and assembled on the front opening formed on the first and second cord grips. In an exemplary embodiment, the guide ring may be formed with a greater diameter than the power cord. In an exemplary embodiment, the first and second cord grips may have a section with interlocking teeth of fixed width at one end.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EXEMPLARY EMBODIMENTS

Figure 1:
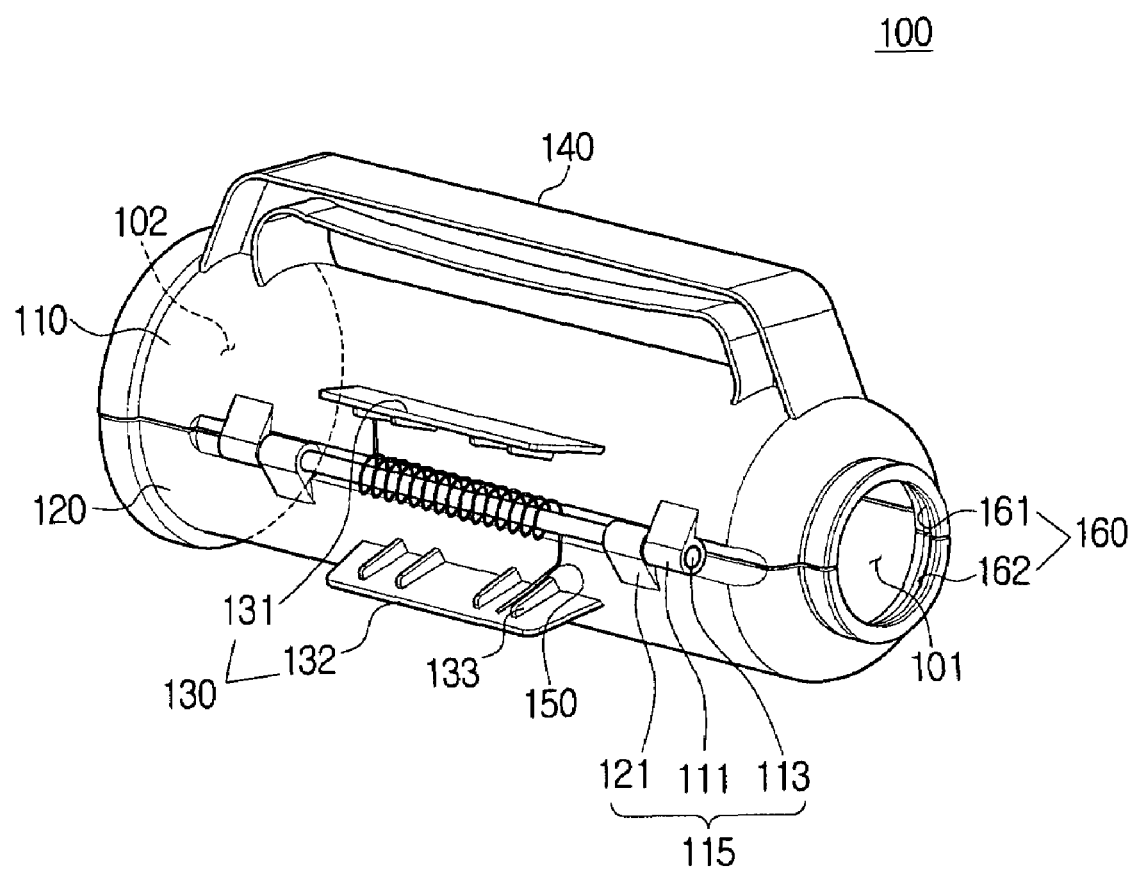
FIG. 1 is a perspective view of a power cord arranging device for a vacuum cleaner, according to one exemplary embodiment of the present invention.

An improved cord handling device and features thereof will now be disclosed in terms of various exemplary embodiments. This specification discloses one or more embodiments that incorporate features of the invention. The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, persons skilled in the art may affect such feature, structure, or characteristic in connection with other embodiments whether or not explicitly described.

In the following description, similar drawing reference numerals may be used for the same elements even in different drawings. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the exemplary features described with unnecessary detail.

Figure 2:
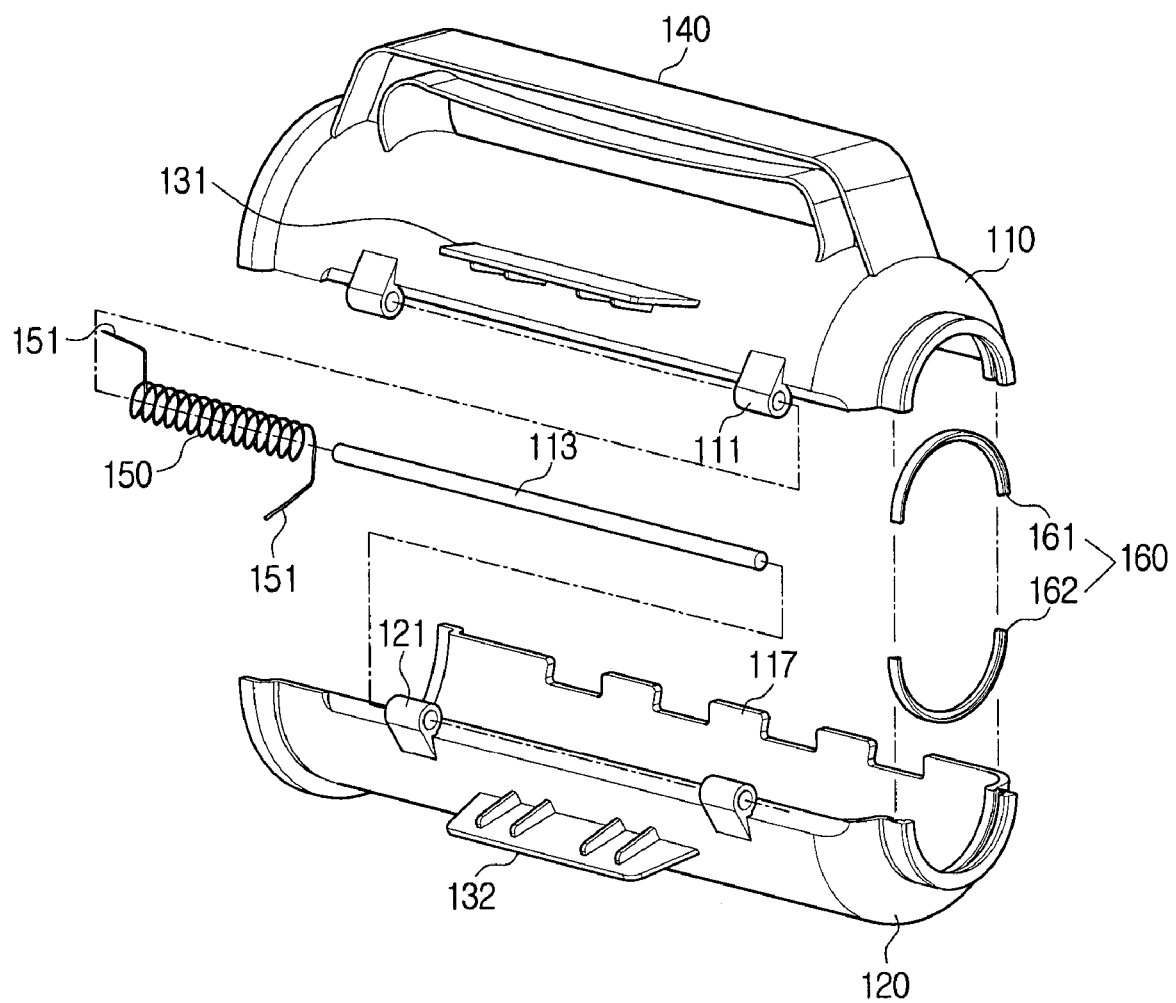
FIG. 2 is an exploded, perspective view of FIG. 1.

As shown in FIGS. 1 and 2, a power cord arranging device 100 for a vacuum cleaner according to an exemplary embodiment of the present invention comprises a first cord grip 110, a second cord grip 120, and a resilient member 150.

The first and second cord grips 110 and 120 are pivotably mounted, are capable of being opened and closed about a hinge part 115, and have at least two openings 101 and 102 so that a power cord may be grasped when the cord grips are closed. The hinge part 115 may have a section 117 (FIG. 2) with interlocking teeth of fixed width at one end.

According to the exemplary embodiment of the present invention, if the first and second cord grips 110 and 120 are engaged with each other, i.e. closed, the openings 101 and 102 may have a cylindrical shape and may face each other.

The hinge part 115 may comprise a pair of shaft receptacles 111 and 121 individually mounted on the first and second cord grips 110 and 120; and a hinge shaft 113 mounted so as to be inserted into the shaft receptacles 111 and 121. Each of the two pair of shaft receptacles 111 and 121 are mounted, and the hinge part 115 is formed while the hinge shaft 113 alternates between the shaft receptacles 111 and 121. Any conventional hinge mechanism may be used to pivotally couple the first and second cord grips 110 and 120.

A pair of pressure levers 131 and 132 are mounted in positions adjacent to the hinge part 115 mounted on each of the first and second cord grips 110 and 120. The pressure levers 131 and 132 may be formed so that the angle between the pressure levers 131 and 132 may be approximately 90° when the first and second cord grips 110 and 120 are engaged with each other. Additionally, the pressure levers 131 and 132 comprise locking projections 133 supporting the resilient member 150. Accordingly, when a user presses each of the pressure levers 131 and 132 thereby squeezing the pressure levers 131 and 132 together, the first and second cord grips 110 and 120 open until the pressure levers 131 and 132 are in contact with each other.

A grip handle 140 may be mounted on the first cord grip 110. When a user arranges the power cord using the power cord arranging device 100, the grip handle 140 enables the user to use the power cord arranging device 100 more conveniently.

The resilient member 150 includes bending arms 151 to keep the first and second cord grips 110 and 120 engaged with each other, as shown in FIG. 2. The resilient member 150 may comprise a torsion spring. As shown, when the hinge shaft 113 passes through the resilient member 150, the arms 151 are supported on the inner sides of the pressure levers 131 and 132, and as the pressure levers 131 and 132 are squeezed together, a resilient restitutive force acts in the opposite direction of the movement of the levers 131 and 132. Accordingly, if the pressure levers 131 and 132 are released, the resilient member 150 may keep the first and second cord grips 110 and 120 engaged with each other.

The openings comprise front opening 101 and rear opening 102, and the rear opening 102 preferably has a greater diameter than the front opening 101. A guide ring 160 is installed in the front opening 101 in order to prevent abrasion.

The guide ring 160 may be made of at least one of steel and brass, and may comprise a first guide ring 161 and a second guide ring 162 on the front opening 101 so as to be separated and assembled on the front opening 101 mounted in the first and second cord grips 110 and 120. The guide ring 160 has a diameter greater than the power cord, thereby reducing friction that may occur between the guide ring 160 and the power cord while winding the power cord.

Hereinafter, an example of operation of a power cord arranging device for a vacuum cleaner according to the exemplary embodiments of the present invention will be described with reference to the accompanying drawings.

Figure 3A:
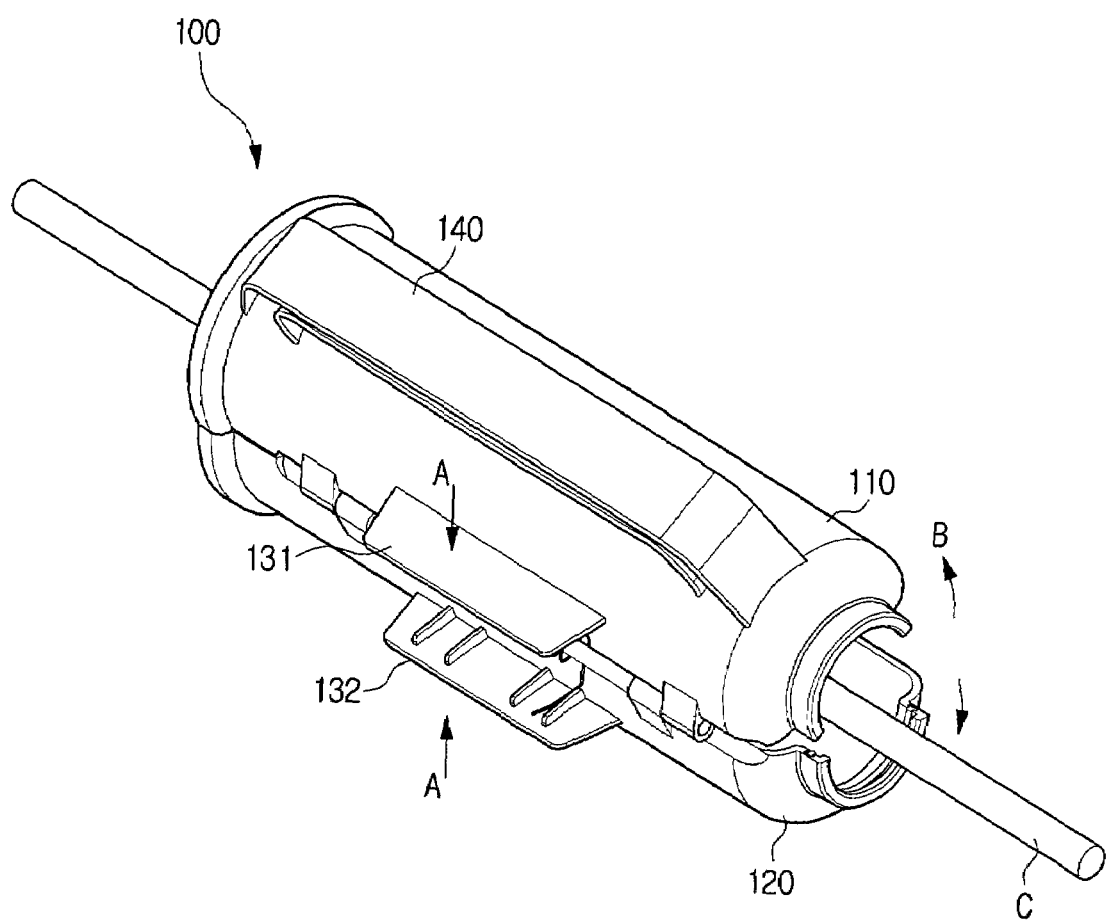
FIGS. 3A and 3B are perspective views showing the movement of the first and the second cord grips when opened using pressure levers to stow the power cord in the power cord arranging device.
Figure 3B:
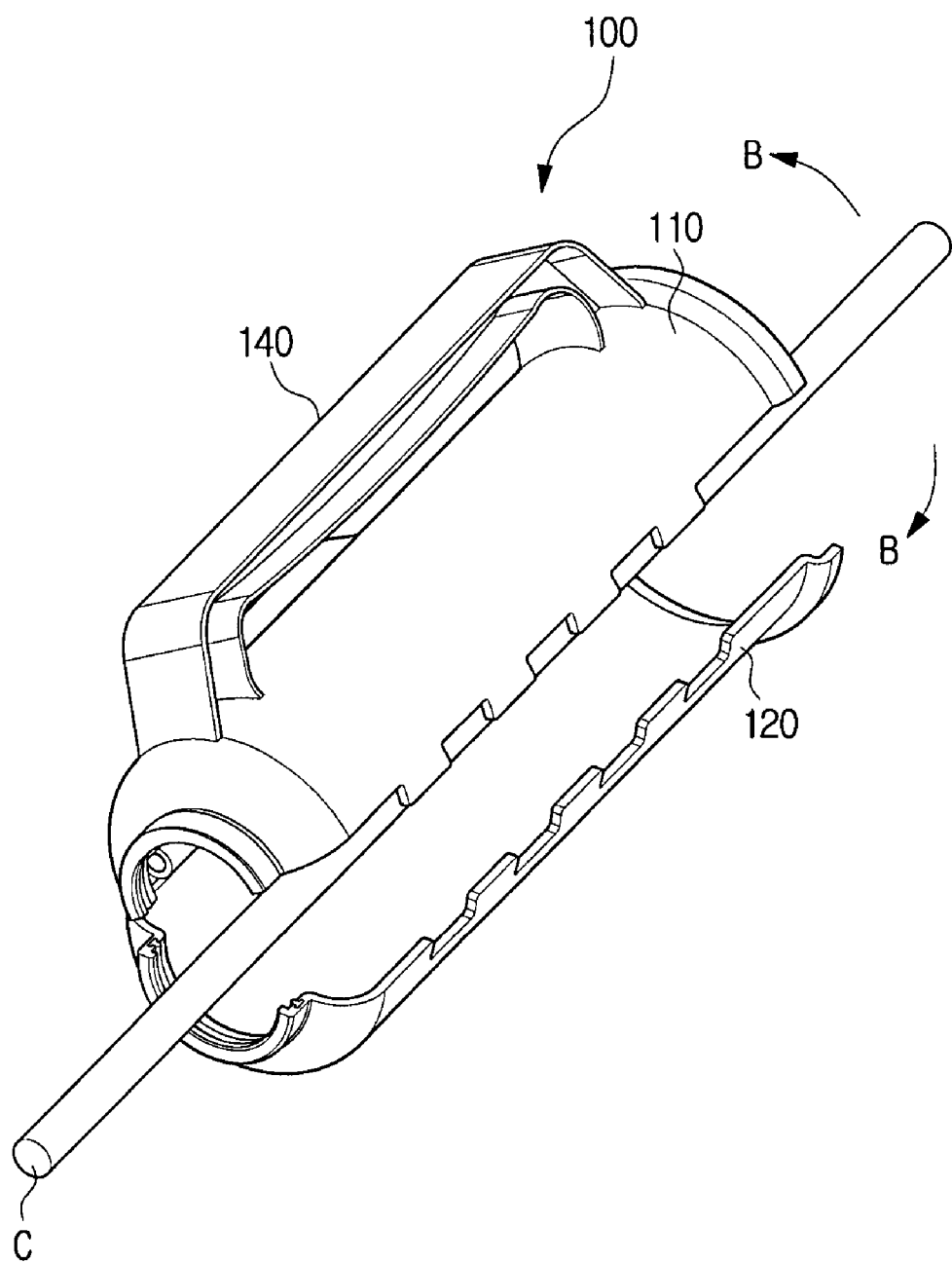

To hold the power cord using the power cord arranging device 100 according to an exemplary embodiment of the present invention, the user has to grasp and wind the power cord C on the power cord arranging device 100. As shown in FIGS. 3A and 3B, as the user presses a portion 'A' of the pressure levers 131 and 132 in the direction indicated by the arrows, an inner space is exposed while the gap between the first and the second cord grips 110 and 120 widens in the direction 'B' indicated by the arrows marked to open the device. The user can thus stow the power cord C in the power cord arranging device 100.

Figure 4:
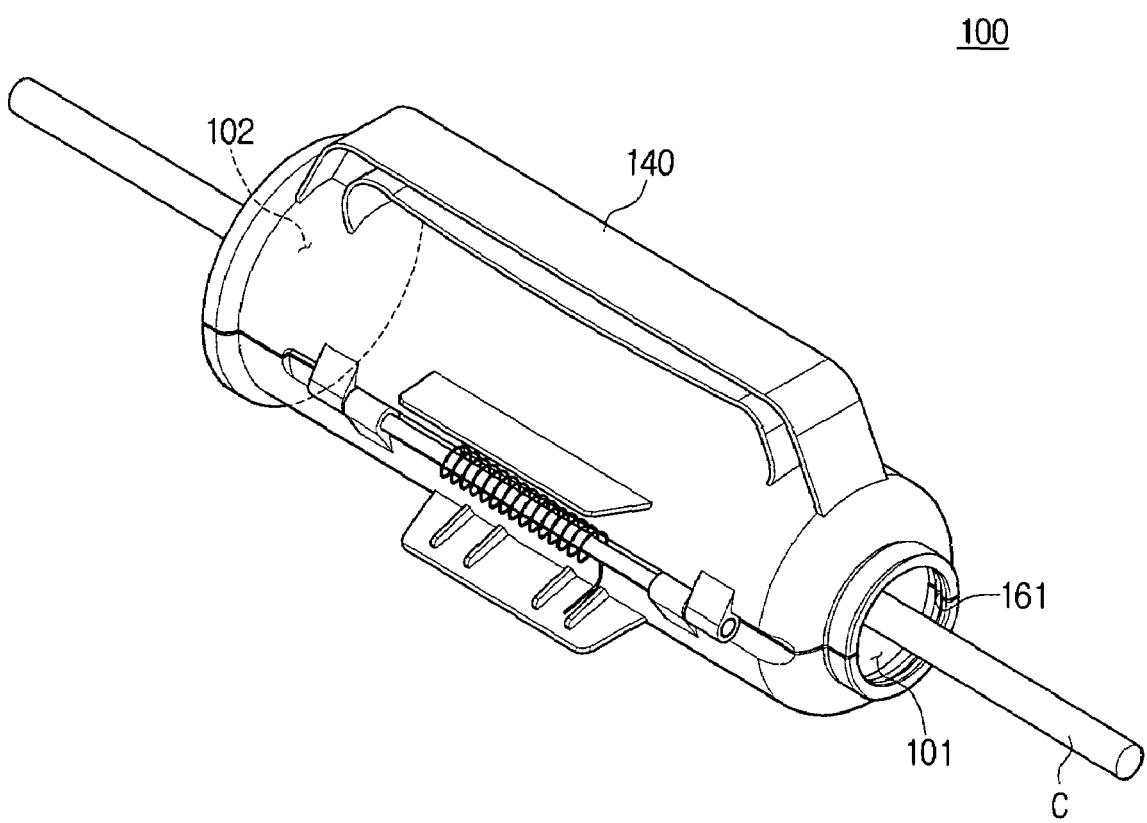
FIG. 4 is a perspective view of the power cord arranging device, according to an exemplary embodiment of the present invention, showing a cord received in the device.

If the power cord C is interposed between the first and second cord grips 110 and 120, the user may release the force acting to the pressure levers 131 and 132, so that the first and the second cord grips 110 and 120 closed. Accordingly, the power cord C is grasped on the power cord arranging device 100 by passing through the front opening 101 and the rear opening 102, shown in FIG. 4.

Figure 5:
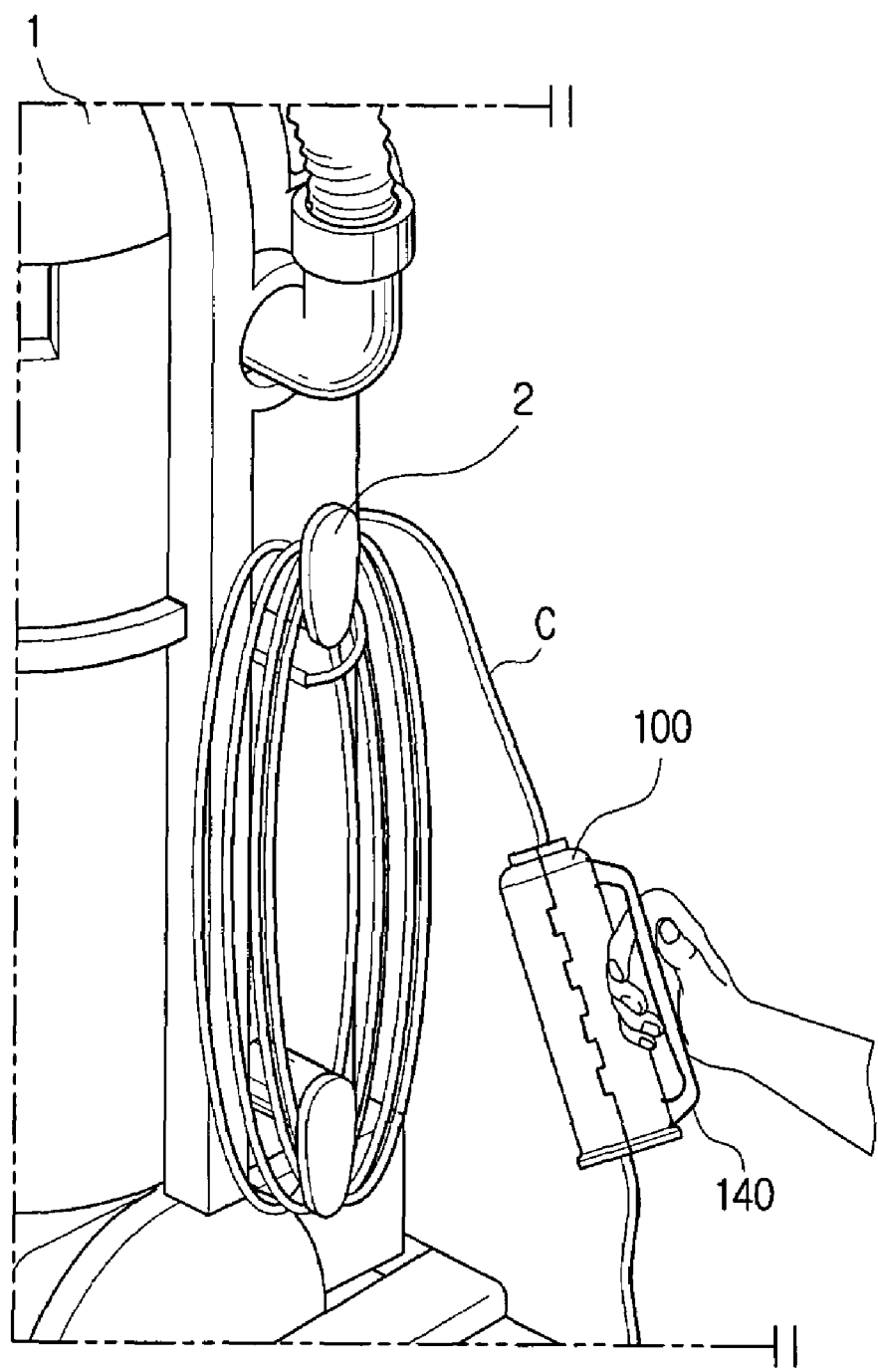
FIG. 5 is a perspective view of a power cord wound on a cleaner body of a vacuum cleaner using the power cord arranging device, according to an exemplary embodiment of the present invention.

In this state, therefore, the user is able to wind the power cord C on a cord holder 2 formed on a cleaner body 1 by holding the grip handle 140, as shown in FIG. 5. When the winding operation is completed, the user presses the pressure levers 131 and 132 again, thereby opening the first and the second cord grips 110 and 120. Accordingly, the power cord C is released from the device.

The guide ring 160 on the front opening 101 is preferably made of metal, such as steel or brass, and has a greater diameter than the power cord C. The guide ring 160 prevents the first and second cord grips 110 and 120 from directly rubbing against the power cord C. Since the first and second cord grips 110 and 120 are generally injection-molded with resin materials, such as plastic materials, they have a lower abrasion resistance than metals. Therefore, the guide ring 160 may prevent the power cord arranging device 100 from being damaged due to abrasion, even after a long period of use.

By using the power cord arranging device 100 according to an embodiment of the present invention, even if the user winds the power cord C rapidly, the power cord C, being guided between the first and the second cord grips 110 and 120, does not directly contact the user's hand. Therefore, the user's hand can be protected from being contaminated by impurities on the power cord C or from getting burned by frictional heat generated between the user's hand and the power cord C.

As can be appreciated from the above description, according to an embodiment of the present invention, the user can safely and conveniently arrange the power cord C without concern about being contaminated by impurities or hurt by frictional heat.

While the invention has been shown and described with reference to certain embodiments thereof, it will be understood by those skilled in the art that various changes in form and details may be made therein without departing from the spirit and scope of the invention as defined by the appended claims.

What is claimed is:

1. A power cord arranging device for a vacuum cleaner, comprising:
   first and second cord grips pivotably mounted, capable of being opened and closed about a hinge part formed at one side thereof, and having at least two openings in order to grasp a power cord when the cord grips are engaged with each other, wherein the openings comprise a front opening, and a rear opening having a greater diameter than the front opening; and
   a resilient member formed on the hinge part to keep the first and second cord grips engaged with each other.

2. The handheld power cord arranging device of claim 1, wherein a guide ring is mounted on the front opening.

3. The handheld power cord arranging device of claim 2, wherein the guide ring is made of at least one of steel and brass.

4. The handheld power cord arranging device of claim 2, wherein the guide ring is separated and assembled on the front opening formed on the first and second cord grips.

5. The handheld power cord arranging device of claim 2, wherein the guide ring is formed with a greater diameter than the power cord.

* * * * *